Dec. 10, 1963  R. B. FROST ETAL  3,113,791
HINGED PIPE COUPLINGS

Filed Jan. 21, 1959  3 Sheets-Sheet 1

RAYMOND B. FROST
and  INVENTORS.
HARTSON J. SEXTON
BY
Albert M. Parker
ATTORNEY.

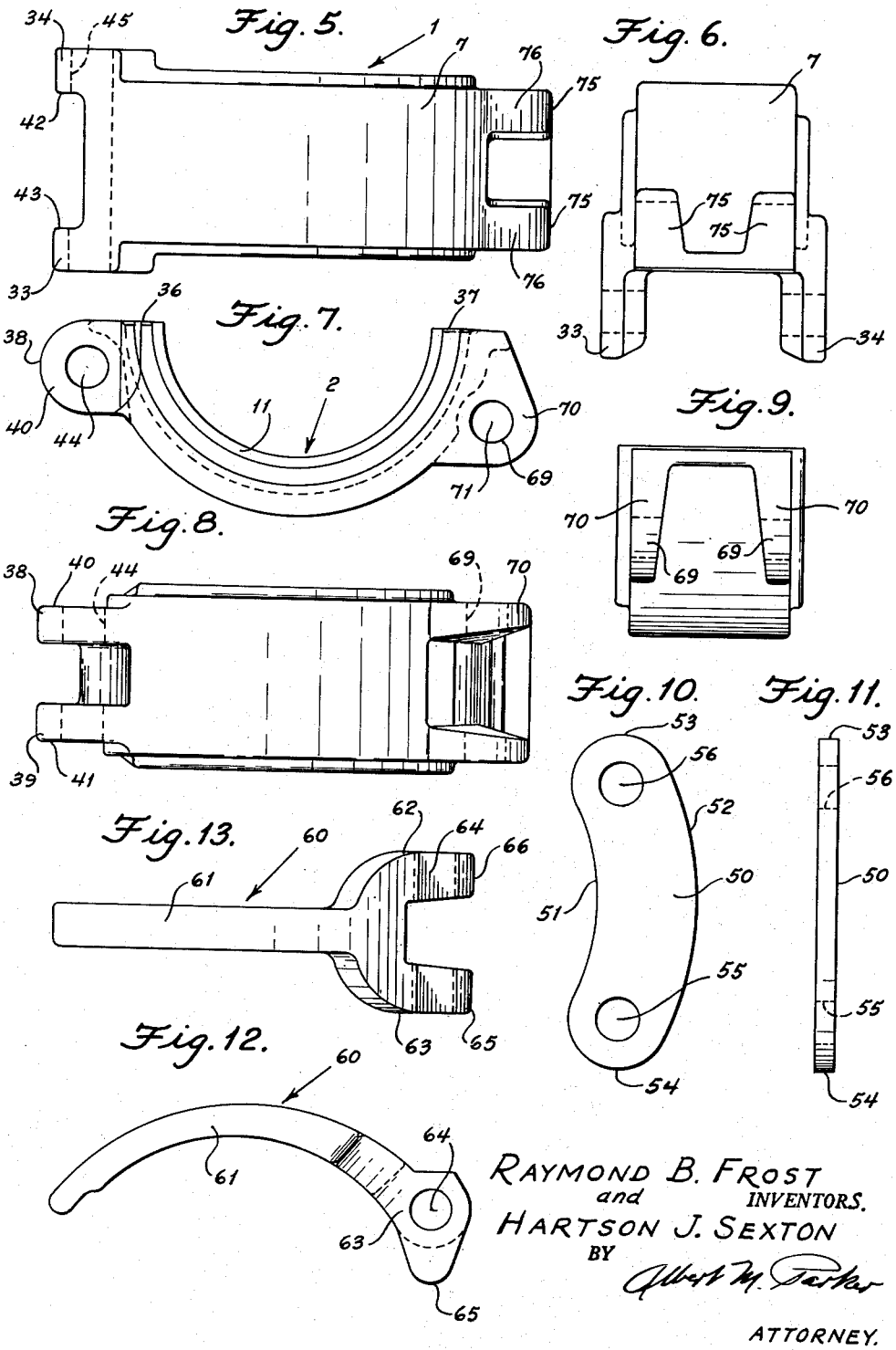

Dec. 10, 1963   R. B. FROST ETAL   3,113,791
HINGED PIPE COUPLINGS

Filed Jan. 21, 1959   3 Sheets-Sheet 3

RAYMOND B. FROST
and   INVENTOR.
HARTSON J. SEXTON
BY

*Albert M. Parker*

ATTORNEY.

3,113,791
HINGED PIPE COUPLINGS

Raymond B. Frost, Short Hills, and Hartson J. Sexton, Union, N.J., assignors to Victaulic Company of America, Union, N.J., a corporation of New Jersey
Filed Jan. 21, 1959, Ser. No. 788,167
6 Claims. (Cl. 285—112)

This invention relates to pipe couplings and is particularly concerned with such couplings which are made up of segmental portions hinged together and with improvements in the hinging aspects thereof.

Heretofore in the forming of hinged couplings for coupling together sections of grooved end pipe, particularly where segmental coupling housings were drawn together by members such as toggles in opposed relation to the hinge, too little attention was paid to the part the hinge plays in the structure. These couplings are commonly employed for the coupling together of pipes carrying fluids under substantial pressure. The effects of that pressure are transmitted to the coupling in various ways. One of these is in terms of forces tending to cause the complete couplings to depart from their true circular shape. If that departure is of any consequence the engagement of the keys of the coupling into the grooves of the pipe will be neither complete nor uniform, thereby weakening the strength of the connection and, further, the gasket which seals the joint between the pipe ends is no longer backed up as it should be by the material of the coupling housings, so is subject to blowout or leakage.

The hinge at one end of the diameter and the toggle, or other closing means, at the other end are the parts of these couplings where the effect of stresses on the coupling is principally made manifest. These parts would have to be very strong, hence heavy and bulky, to approach the strength characteristics of continuous rings without any breaks. Continuous rings would, of course, be free of distortion as the stresses would effect them uniformly together.

When the complete circle of the coupling is broken into parts, such as semi-circular segments, as it must be to apply it to the pipe ends, and when those parts are joined together by hinges and toggle members set out from the circular contour, bending moments are introduced. Considering this from the standpoint of the hinge the bending moment is, generally speaking, directly proportional to the radial distance between the center of the hinge pin and the cylindrical surface of the coupling which backs up the gasket. The stress in the coupling, when under pressure, is centered approximately at that cylindrical surface.

What happens when the coupling is stressed is that the hinge pin tends to move in toward the center of the coupling circle. That tendency is proportional to the bending moment, so the further out the hinge pin, the greater the tendency. What results from the bending moment here is that the coupling goes out of round, becomes oval or egg shaped, and failure of the gasket, or of the coupling in its entirety, results.

If the hinge pin could be moved in to the zone where the stress is centered, the bending moment could be eliminated but that cannot be done because there must be a substantial thickness of the housing material to back up the gasket. Furthermore, with the hinge in the "on center" position, i.e., with its hinge axis lying in the plane determined by the ends of the coupling half housings when they are assembled in closed position, the distance taken up by the width of the hinge ears must be included in the distance between the hinge pin center and the cylindrical surface of the coupling in back of the gasket. Thus the bending moment is substantial.

It has been discovered, however, in accordance with the invention, that by moving the hinge off-center it can be moved radially inwardly, for here the wall of the hinge lug and the wall of the lower housing becomes a common part. Even a small inward movement reduces the bending moment substantially, so that anything that can be gained here is most desirable. Besides reducing the bending moment the inward movement here also results in less weight of the coupling housing for the same strength. Furthermore, this can be achieved by keeping the hinge lugs within the longitudinal confines of the housing, thereby eliminating the undesirable aspect of having these lugs as outwardly extending projections.

The extent to which the hinge pin can be moved in is limited by the inward positioning possible for the toggle or other securing means opposite the hinge. In the case of a toggle the position of the lower hinge pin provides the limiting factor. There is no point in moving the hinge pin in further than it is possible to move the toggle pin in.

The off center hinge positioning in no way interferes with the inclusion of provision for prestressing the hinge so that there will be no possible play in it. In order to accomplish this, however, it is necessary, as pointed out in U.S. Patent #2,752,174 dated June 26, 1956, to Raymond B. Frost, and owned by applicant's assignee, to have the opposed radial end surfaces of the coupling housings come together at a fulcrum line spaced radially outwardly with respect to the inner surface of the coupling housings. The invention construction still leaves room for this feature to be effectively included.

It is, accordingly, a principal object of the invention to improve upon the hinging of the housings of hinged couplings.

Another object is to materially reduce the tendency of coupling housings formed of secured segments to go out of round when stressed.

Another object is to reduce the bending moment resulting from the securing together of segments of coupling housings.

Still another object is to reduce that bending moment in respect of couplings formed of hinged segments.

Still another object is to reduce that bending moment while keeping down the weight of coupling housings in relation to their strength.

A further object is to improve on hinge constructions for the hinging together of coupling housings while maintaining the number of parts thereof at a minimum.

A further object is to improve on such hinge constructions from the standpoint of reducing bending moment while retaining provision for the prestressing of hinges.

A still further object is to improve upon toggle constructions for the drawing together and tightening of hinge coupling housings.

A still further object is to improve upon hinge constructions of hinged coupling housings without interfering with the effective inclusion of the gaskets therein.

Further and more detailed objects will in part be obvious and in part be pointed out as the description of the invention taken in conjunction with the accompanying drawing proceeds.

In that drawing:

FIG. 5 is a top plan view thereof.

FIG. 6 is an end elevation thereof as viewed from the right hand end in FIGS. 4 and 5.

FIG. 7 is an elevation of the lower one of the pair of housings in accordance with the invention.

FIG. 8 is a bottom plan view thereof as viewed from the underside of FIG. 7.

FIG. 9 is an end elevation, as seen from the right hand end, of FIG. 7.

FIGS. 10 and 11 are respectively front and end elevations of toggle links in accordance with the invention.

FIGS. 12 and 13 are respectively a front elevation and a top plan view of the toggle handle in accordance with the invention.

The coupling of the invention, as illustrated in the accompanying drawing, is composed of two arcuate housing sections, generally indicated at 1 and 2. Each of these encompasses one-half of a circle, and when brought together properly form a complete circle. These half housings terminate in radial end surfaces so that when they are assembled on a pipe to be joined, their ends come together in abutting plane surfaces, as indicated at 3 and 4 in FIG. 1. The construction of each of the half housings here going to make up a complete coupling is basically the same though they differ in respect of the features by which they are secured together. Generally speaking, the housings are hinged together at one of their abutting positions about a hinge pin 5 whose center 6 is off center with respect to the plane passing through the positions 3 and 4.

Figure 3:
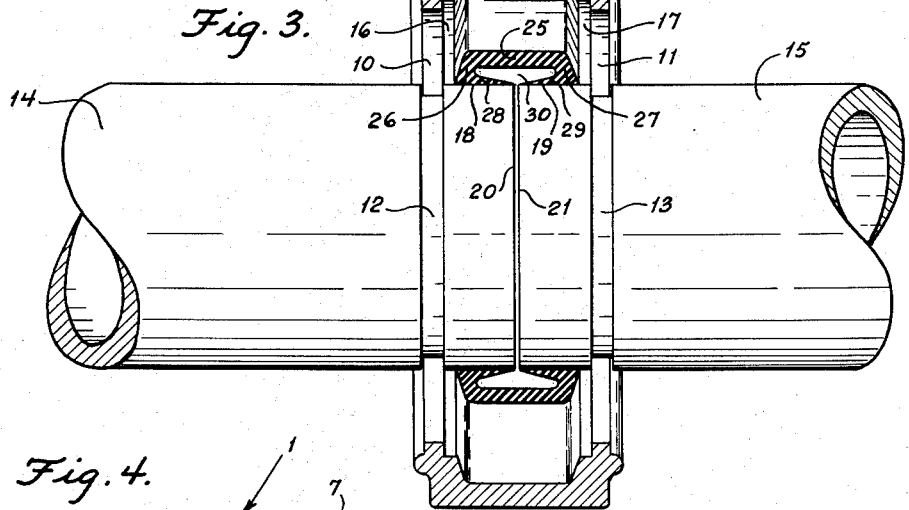
FIG. 3 is a vertical section of a pair of coupling housings in accordance with the invention including the gasket therewithin and showing the same as applied to sections of grooved end pipes to be joined.

Considering the detail of the half housing 1, it has a peripheral base portion 7 bordered by radially inwardly extending rim portions 8 and 9, each of which terminate in the form of radial inwardly extending ribs, known as key sections, 10 and 11. These, as best shown in FIG. 3, are formed to engage in the grooves 12 and 13 in the outer surfaces of the sections of pipes 14 and 15 to be joined together.

From the inner sides of the key sections 10 and 11 the rims 8 and 9 are stepped radially inwardly and then laterally to form shoulders 16 and 17 which overlie the small annular portions of the pipe surfaces 18 and 19 extending between the grooves 12 and 13 and the respective ends 20 and 21. The shoulders 16 and 17 are preferably on a somewhat greater diameter than the O.D. of the pipe, thus are spaced outwardly a little from the surfaces 18 and 19 in order to allow flexibility at the joint.

From the shoulders 16 and 17 the housing section extends outwardly in wall portions 22 and 23 at a slight angle inwardly with respect to the rest of the housing to form side walls for a gasket receiving groove, whose bottom 24 extends between the slides 22 and 23. This groove snugly receives and supports a suitable gasket formed to overlie the pipe ends 20 and 21 and to form a tight, leak-proof joint between the pipe sections. As here shown, the gasket is of C-shape in cross section having a base 25, sides 26 and 27 and thin flexible lips 28 and 29. These lips engage the outer surface portions 18 and 19 of the pipe ends, so that pressure exerted within the annular gasket chamber 30 will force the lips 28 and 29 against the surfaces 18 and 19 and provide a tight, leakproof joint.

In the present instance, the basic structure of the half housing 2, to the extent just mentioned, is the same as that of the half housings 1, so the same basic parts are given the same reference characters. The housings differ, however, in their exterior constructions for the reception or mounting of the hinge and toggle. Considering, then, the hinge and toggle aspects of the half-housing 1, as shown per se in FIGS. 4, 5, and 6, it is first to be understood that in the application of the coupling to a pipe the half housing 1 would normally be the upper housing and will hereafter be considered as such.

Figure 14:
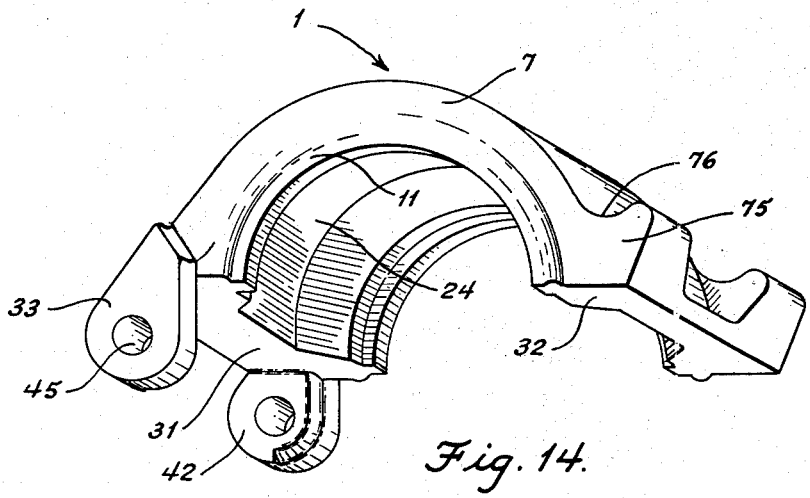
FIGS. 14 and 15 are respectively perspective views of the upper and lower coupling housings as viewed from positions to best illustrate the hinge end formations thereof.

As will be apparent, the half housing 1 encompasses a full semi-circle and has free end faces 31 and 32 lying in the same plane at the opposite ends of the diameter of the circle. At its left end, as viewed in FIGS. 1, 4 and 14, it is provided with a pair of spaced, outwardly and downwardly extending hinge ears 33 and 34 (see FIG. 5). These extend downwards well past the free end surface 31, but their extent radially outwardly is limited to that necessary to provide effective hinging. In fact, the objective here is to have the hinge off center with respect to the diameter established by the surfaces 31, 32, but to keep it as close in towards the circle of the housing as possible. This is to keep down the bending moment produced by the joining. The essential features then are the position of the center 6 of the hinge pin (FIG. 1) and the provision of the ears 33 in such a manner as to provide effective hinging in proper position to reduce the bending moment but without undue weight or obstruction.

By offsetting along one of the housing segments with respect to the plane passing through the hinge pin the center of the pin may be moved radially inward with respect to the base 24 of the gasket groove. By spreading the ears 33, 34 somewhat they can be caused to extend in part way over the lower housing section and to encompass the mating ears carried by the lower housing segment. In this way the hinge pin can be moved radially inwardly a substantial extent. The toggle pin at the opposite side cannot be moved so far inwardly, hence there is no point in moving the hinge pin to the fullest possible extent. Even a small movement, however, reduces the bending moment to considerable extent. In the invention construction, also, the provision of the fulcrum line 35, with its prestressing function is retained.

Considering now the housing 2, which will be referred to as the lower housing, its arcuate body, as already pointed out, has the same construction as that of the upper housing, so like parts carry the same reference characters. At the free ends of its semi-circular arc the lower housing 2 terminates in plane surfaces 36 and 37, which, like the surfaces 31 and 32 of the upper housing, lie in a plane on the diameter of the completed coupling when the arcuate portions thereof are joined together. These plane surfaces 36, 37 are designed to come into tight contact with the surfaces 31 and 32 when the housing is in closed position.

Figure 15:
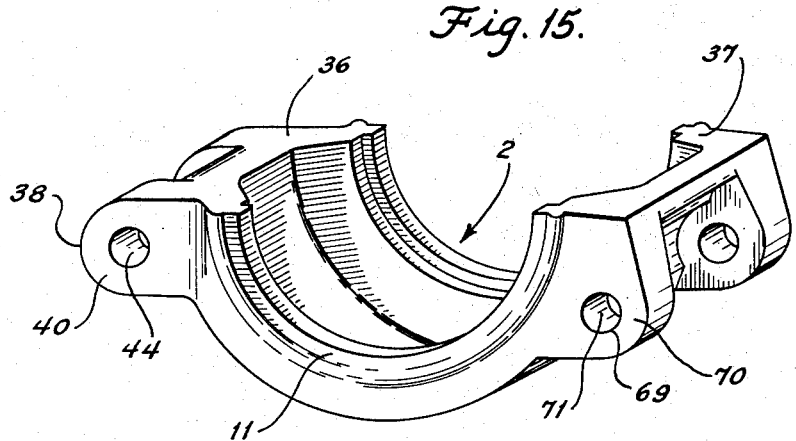

At its left hand end, as viewed in FIGS. 7, 8 and 15, the lower housing 2 is provided with a pair of laterally outwardly extending hinge ears 38 and 39. These, as best seen in FIG. 7, extend directly outwardly from the body of the housing just below the surface 36. They are spaced apart so that their outer plane side surfaces 40 and 41 ride in hinging relationship within and against the opposed inner plane surfaces 42 and 43 of the ears 33 and 34 of the upper housing. Furthermore, the ears 38 and 39 are bored transversely with a hinge pin receiving opening 44 for alignment with a similar opening, 45, extending through the hinge ears 33 and 34, when the respective sets of hinge ears are properly seated together.

To reduce the bending moment as already described, the hinge pin receiving bore 44 is positioned radially inwardly with respect to the body of the lower housing 2 to considerable extent as against its position in an on center construction. The bore 45 is similarly positioned in the ears 33 and 34. Thus the ears receive the hinge pin and complete the hinging at a position where the bending moment on the hinge is materially reduced.

Figure 1:
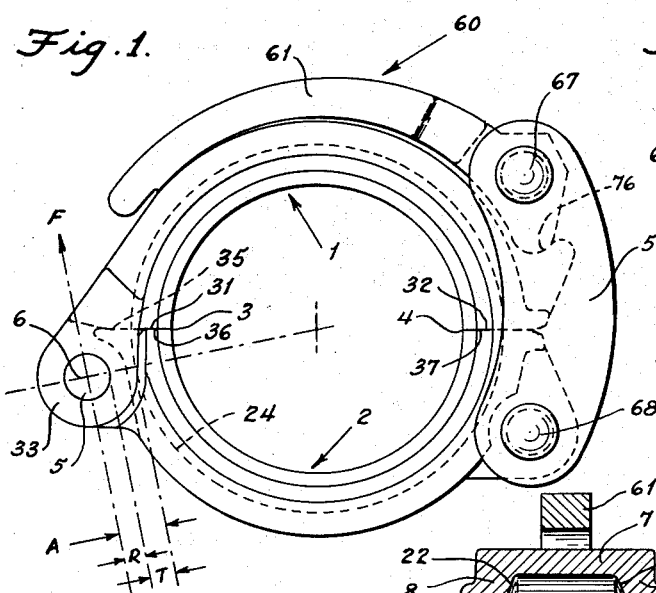
FIG. 1 is a front elevation of a pair of coupling housings in accordance with the invention showing the same in closed position.

Reverting back now to the assembly of the housings of FIG. 1, for a more detailed understanding of the improved hinging of the invention it will be seen that the bending moment resulting from the hinge pin position is measured by the force applied in the direction F times the distance A, where the distance A is made up of the distance R equal to the radius of the hinge pin and the distance T equal to the radial thickness of the hinge ear. This radial thickness, in the construction of the invention, when measured inwardly on the line between the axis of the hinge pin and the axis of the coupling substantially includes the thickness of the base portion 7 of the housing. In a coupling of the same size, where the hinge is on-center, the factor of the thickness of the housing material at the base of the gasket groove must be included in addition to the radial thickness of the hinge ear. There, then, the length of the arm is greater and the bending moment is correspondingly greater. As an example, the bending moment for a 2½" coupling in accordance with the invention is substantially 37.5% less than that for an otherwise comparable on-center coupling of the prior art.

Considering the toggle positioned at the opposite side of the coupling from the hinge, this is made up of a pair of links 50 formed on a somewhat flattened arc having an interior concave surface 51, an exterior convex surface 52, rounded ends 53 and 54 and bores formed therethrough at 55 and 56 for the passage of pivot pins. This toggle is provided with a handle, generally indicated at 60, having an actuating portion 61 formed in an arc mated to the exterior contour of the coupling housings. At its inner end the handle 60 terminates in spaced apart ears 62 and 63 which are transversely bored at 64, the same as the bores 56 in the toggle links, for the reception of the link pin therethrough. These ears 62 and 63 are turned downwardly in the course of their extent to terminate in downwardly extending rounded nose portions 65 and 66. It will thus be apparent that to complete the toggle, the toggle arm is assembled with a pair of the links, such as 50, one link being applied to each side of the toggle arm, extending downwardly therefrom as the same appears in FIGS. 1 and 12, with the arm and links suitably secured together by means of a link pin 67 passing through the pair of bores 56 and the bores 64.

At its lower end the toggle is fixedy pivoted to the lower housing by means of a pivot pin 68 which passes through both of the bores 55 and through the bore 69 formed through each of the pair of toggle ears 70 carried by the lower housing 2. These toggle ears 70, like the hinge ears 40 and 41 extend outwardly from the body of the lower housing at a position below the end surface 37 thereof. Here, of course, the bore 69 for the hinge pin 68 is positioned sufficiently downwards around the exterior of the lower housing to provide effective operation of the toggle. With respect to the radial position of the toggle pin 69, however, the nature and action of the toggle impose limitations on the extent to which its center 71 can be moved radially inwardly. This is believed to be apparent from the showing in the drawing. As already pointed out, the position of the toggle hinge 69 being so limited there is no point in moving the hinge pin 5 in further.

Figure 2:
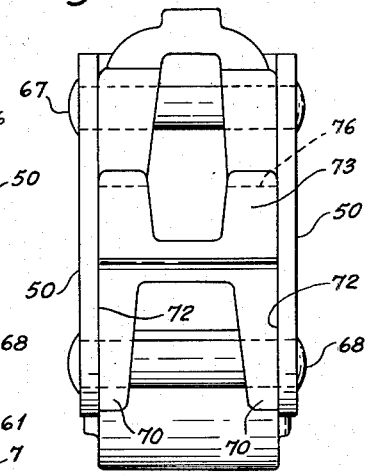
FIG. 2 is an end elevation thereof as seen from the right hand side of FIG. 1.

As seen in FIG. 2, the links 50 make surface to surface contact with the outer surfaces 72 of the toggle ears 70, so swing in alignment with the coupling housings in the course of their operation.

Figure 4:
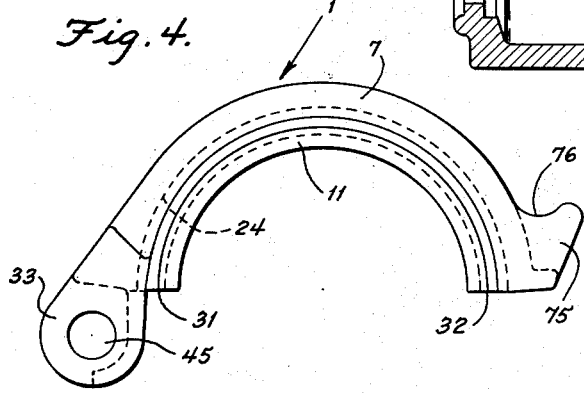
FIG. 4 is a front elevation of the upper one of the pair of coupling housings.

The upper housing 1, at its right hand side as seen in FIG. 4, is provided with a pair of laterally outwardly extending lugs 75 having downwardly recessed shoulder portions 76 forming their upper surfaces for engagement by the round noses 65 of the toggle arm 60. Thus, with the toggle elements properly positioned and the toggle assembled with the coupling as illustrated in FIG. 1, the closing of the toggle as shown in that figure first springs the bodies of the housings 1 and 2 about the fulcrum line 35 to prestress the hinge 5 and, by continuing, brings the pairs of surfaces 31, 36 and 32, 37 into tight surface to surface engagement, as shown at 3 and 4 in FIG. 1. This engagement is achieved as the toggle snaps into closed position.

In applying the coupling of the invention to effect a joint between a pair of pipe ends, the first thing that is done is to install the gasket in proper position over the pipe ends to be joined, which is normally done by applying the gasket over one pipe end inserting the other pipe end thereinto. Then, with the toggle fully opened up and the upper housing 1 hinged outwardly, the coupling is applied to the pipe from underneath. The lower housing segment is seated up over the gasket with its key sections 10 and 11 in engagement with the pipe grooves 12 and 13. Once this is done the upper housing is swung about its hinge 5 into closed position. Pinching of the gasket at the hinge end is substantially precluded by the fact that the hinge is positioned below the line where the half housings come together. The upper housing 1 is thus swung into closed position, the toggle noses 65 are engaged with the surfaces 76 and the toggle handle 60 is swung to the left, as viewed in FIG. 1, to first stress the housings and then close them tightly across the planes 3 and 4. The substantial construction and engagement of the toggle will assure that the joint, once tightly effected, will remain so.

Though the presently preferred embodiment of the invention has been shown and described in the foregoing and in the accompanying drawing, it will of course be understood that this showing and description is for illustrative and not limiting purposes. Other manners of positioning the hinge to reduce the bending moment thereof may well suggest themselves to those skilled in the art without departing from the spirit and scope of the invention. Other basic forms of coupling housings may likewise have the hinge improvement of the invention applied thereto. Also, other toggle constructions, or other effective securing means, may be employed at the opposite side of the coupling from the hinge, all without departing from the spirit and scope of the invention.

Speaking more generally, since certain changes may be made in the above article and different embodiments of the invention could be made without departing from the scope thereof, it is intended that all matter contained in the above description or shown in the accompanying drawing shall be interpreted as illustrative and not in a limiting sense.

Having described our invention what we claim as new and desire to secure by Letters Patent is:

1. In coupling housing construction for effecting a joint between the ends of grooved pipe, a coupling housing formed of segments of a cylinder, the ends of two of said segments lying in radial planes and said radial planes when said coupling is complete lying in a common plane of joinder and hinge means for hinging said segments together to bring said radial planes into and out of said common plane of joinder, said hinge means including hinge ear means fixedly secured to the exterior surface of one of said segments adjacent the end thereof and extending substantially completely past said end to overlie the other of said segments adjacent its end, hinge ear means fixedly secured to the exterior surface of the other of said segments lying substantially wholly rearwardly with respect to said end of said other of said segments and having a portion lying in overlapping relationship with respect to the hinge ear means of said first segment, said overlapped portions having an aligned bore therethrough and a hinge pin seated within said bore, said hinge pin lying parallel to the axis of said housing and having the radially innermost portion thereof lying substantially in alignment with a continuation of the outer surface of said coupling housing cylinder.

2. In coupling housing construction for effecting a joint between the ends of grooved pipe, a coupling housing formed of segments of a cylinder, said housing being annularly recessed interiorly for the reception of a gasket, said recess having a wall in back of the base of the same for backing up said gasket and said wall being formed with an outer circumferential surface, the ends of two of said segments lying in radial planes, and said radial planes when said coupling is complete lying in a common plane of joinder the portions of said circumferential surface embraced by said segments extending continuously between the ends of said segments and hinge means for hinging said segments together to bring said radial planes into and out of said common plane of joinder, said hinge means including, first hinge ear means fixedly secured to the exterior of one of said segments adjacent the end thereof and having the major portion thereof extending beyond said end to overlie the other of said segments adjacent its end, second hinge ear means fixedly secured to the other of said segments and having the major portion thereof lying in overlapping relationship with respect to said extending portion of said hinge ear means of said first segment, said overlapping portions having an an aligned bore therethrough and a hinge pin seated within said bore, said hinge pin lying parallel to the axis of said housing and said bore having the radially innermost portion of its circumference lying at substantially the same radial distance from the axis of said housing as the radius of said cylindrical surface.

3. Coupling housing construction as in claim 2, one of said hinge ear means comprising pairs of spaced hinge ears.

4. Coupling housing construction as in claim 2, each of said hinge ear means comprising pairs of spaced hinge ears.

5. In coupling construction for joining together the ends of a pair of sections of grooved end pipe, a coupling housing in the form of a cylinder formed of a pair of semi-cylindrical segments, said segments being formed with end surfaces lying in radial planes and said segments when in secured position having the pairs of planes at their opposed ends coinciding, said housing being formed with radially inwardly extending key sections at the axially remote sides thereof and having a radially outwardly extending body portion extending between said key sections, said body portion being formed with an internal groove for the reception of a gasket and having a wall of substantial thickness at the base of said groove and between said groove and the outer surface of said housing to back up said gasket and impart strength to said housing, said semi-cylindrical segments being hinged together to swing towards and away from each other in a radial plane, and hinge means carried by the exterior surface of said segments for effecting said swinging, said hinge means including a first pair of hinge ears extending integrally from one of said segments generally concentrically with respect thereto and beyond the opposed end of the adjacent segment and being formed with a hinge pin receiving bore therethrough at a position beyond said opposed end and said bore having an axis parallel to the cylindrical axis of said housing, a second pair of hinge ears extending integrally outwardly from the outer surface of the other of said segments and lying within and in overlapping relationship with respect to said first pair and being formed with a hinge pin receiving bore therethrough in continuation of said bore of said first pair, the portion of said bore closest to the cylindrical axis of said housing substantially coinciding with the normal outer surface of said housing, a hinge pin received in said bore and toggle means opposite said hinge to secure said housing in closed position, said first pair of hinge ears extending downwardly from the upper one of said segments as said housing is positioned for application to pipes to be joined.

6. In coupling housing construction for effecting a joint between the ends of grooved pipe, a coupling housing formed of segments of a cylinder, the ends of two of said segments lying in radial planes and said radial planes when said coupling is complete lying in a common plane of joinder and hinge means for hinging said segments together to bring said radial planes into and out of said common plane of joinder, said hinge means including hinge ear means fixedly secured to the exterior surface of one of said segments adjacent the end thereof and extending substantially completely past said end to overlie the other of said segments adjacent its end, hinge ear means fixedly secured to the exterior surface of the other of said segments lying substantially wholly rearwardly with respect to said end of said other of said segments and having a portion lying in overlapping relationship with respect to the hinge ear means of said first segment, said overlapped portions having an aligned bore therethrough and a hinge pin seated within said bore, said hinge pin lying parallel to the axis of said housing and being positioned closely adjacent the outer surface of said other segment whereby the bending moment resulting from the position of said hinge pin is minimized, said hinge pin having the portion of the surface thereof which is radially innermost with respect to said axis of said housing lying substantially in alignment with said outer surface of said other segment.

References Cited in the file of this patent

UNITED STATES PATENTS

| | | |
|---|---|---|
| 1,649,752 | Stone | Nov. 15, 1927 |
| 2,449,795 | Stillwagon | Sept. 21, 1948 |
| 2,673,102 | Hutchinson | Mar. 23, 1954 |
| 2,752,174 | Frost | June 26, 1956 |
| 2,938,484 | Garland | May 31, 1960 |

FOREIGN PATENTS

| | | |
|---|---|---|
| 412,186 | Great Britain | June 19, 1934 |